Nov. 24, 1925. 1,562,734
L. BAUDET
RUNNING GEAR FOR LOCOMOTIVES WITH FOUR DRIVING AXLES
Filed May 20, 1925
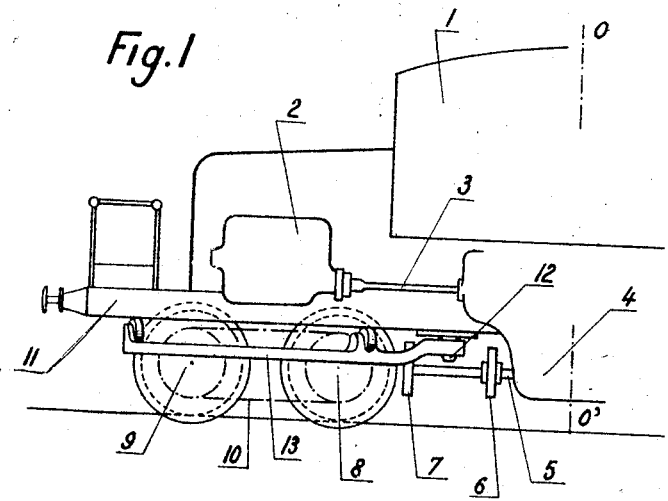
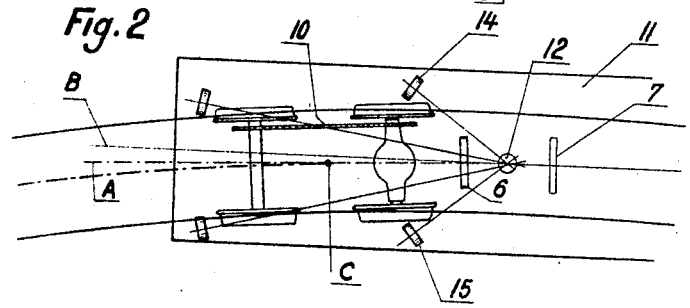
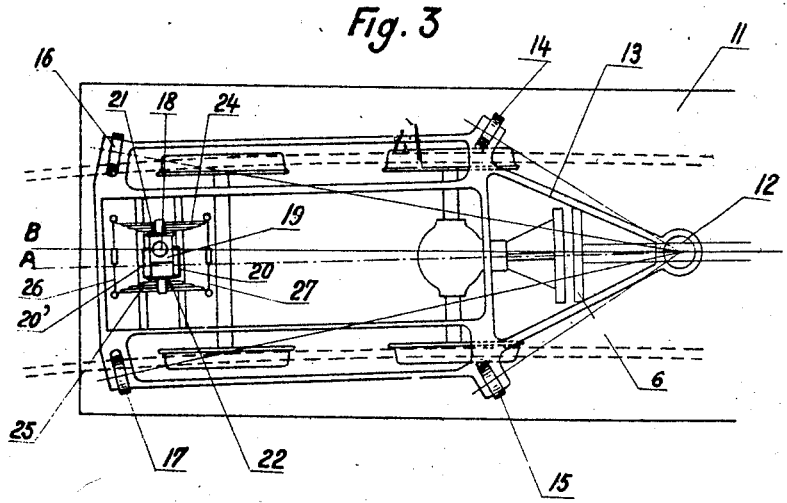
Inventor
L. Baudet Patented Nov. 24, 1925.

1,562,734

UNITED STATES PATENT OFFICE.

LOUIS BAUDET, OF PARIS, FRANCE.

RUNNING GEAR FOR LOCOMOTIVES WITH FOUR DRIVING AXLES.

Application filed May 20, 1925. Serial No. 31,656.

*To all whom it may concern:*

Be it known that I, LOUIS BAUDET, citizen of the French Republic, residing at 139 Rue Saussure, Paris, France, have invented certain new and useful Improvements in Running Gears for Locomotives with Four Driving Axles, of which the following is a specification.

The present invention relates to locomotives with four driving axles actuated by heat engines and provided with a transmission device similar for instance to that described in applicant's French Patent 581,248 dated April 25, 1924 and entitled "Transmission device for a vehicle with two motors".

It is known that all vehicles for railroad traffic the total wheel base of which is greater than 5 meters for instance, must be provided with a special running gear in order to allow an easy guiding of the vehicle in curves. For this purpose, bogies have already been used each of which comprises two axles rigidly secured together and pivoting round a vertical projection disposed between and at equal distance from the two axles and in the axis of the vehicle. Ordinary end axles have also been used each of which is secured to a triangular frame known as a Bissell-bogie pivoting round a vertical projection disposed at a suitable comparatively great distance from the axle near the center of the vehicle; but these radial axles are never driving axles.

In locomotives provided with a mechanical transmission the Bissell-bogies cannot be used as driving axles without greatly complicating the transmission gear between the Bissell-gears and the ordinary axle next to it.

In the case which is being considered of a vehicle provided with four driving axles, the connection between both axles of each half of the vehicle comprises merely a rigid transmission device (chain or connecting rod). If the end axle is free with reference to the inner axle, a special transmission device is necessary with universal joints, another axle bearing containing angle pinions and so forth.

As far as concerns bogies, longitudinal transmission devices exist with universal joints, but they offer the drawback of requiring by reason of the pivoting movement of the bogie, great angular movements in the universal joints which cause their speedy wearing out.

According to the present invention, the two axles corresponding to one half of the vehicle are secured to the main frame like a Bissell-bogie and pivot round a vertical projection in the axis of the vehicle and at equal distances from two universal joints or elastic couplings of the longitudinal driving shaft. In these conditions, the angular movement in each universal joint when the locomotive runs along a curve, is very small because the joints are nearer the pivot and the angular movement is equally distributed between both joints as the pivot of the Bissell-frame is at equal distances from both joints.

A form of execution of the present invention is shown by way of example on appended drawing.

Fig. 1 is a diagrammatical side view of the running gear.

Fig. 2 is a plan view on a reduced scale showing the deformations of the longitudinal transmission exaggerated for sake of clearness.

Fig. 3 is a diagrammatical plan view of the running gear. The locomotive which is symmetrical with reference to the central plane 00' comprises a central control cabin 1 and for each half of the vehicle a motor 2 (the front half of the vehicle alone being shown on drawing). The shaft 3 of this motor passes into the central casing 4 containing the mechanical devices connecting the motors with the rest of the driving gear, the change speed gear and the transmission device. The common driving shaft 5 passes out of the casing 4 and bears two universal joints 6, 7 or any other suitable elastic coupling devices allowing angular movements. This shaft 5 controls directly the axle 8 which in its turn controls the axle 9 through the chains 10 or through connecting rods. A pivot 12 is secured to the frame 11 of the vehicle in the longitudinal central plane of the vehicle and at equal distances from both universal joints 6 and 7. A frame 13 yieldingly borne by the axles 8 and 9 is adapted to oscillate round the pivot 12. The frame 13 comprises a rectangular part connected by a triangle to the pivot. At each angle of the rectangular part 14, 15, 16 and 17 is disposed a roller the plane of which is perpendicular to the line connecting it with the pivot 12. The frame 11 of the locomotive rests on these rollers and is also connected to the Bissell-frame 13 at its outer end, in the following manner. The frame of the locomotive is provided with a projection 18 which enters a sliding-block 19 (Fig. 3) which is held between the slides 20, 20' secured to the Bissell-frame and directed perpendicularly to its axis. On either side of the ends of these slides are the plates 21, 22, secured to the plate springs 24, 25 ends of which are connected by the ties 26, 27 of adjustable length.

The working of this running gear is easily understood by looking over Figs. 2 and 3. When the locomotive is guided in a curve, the Bissell-frame 13 the axis of which is shown in A (Fig. 3) oscillates with reference to the frame 11 of the locomotive the axis of which is shown in B. The projection 18 of the frame of the vehicle has to remain on line B makes the sliding block 19 move with reference to the slides 20, 20', as seen on Fig. 3; the sliding block 24 presses therefore against the plate 21 and the spring 24 which it bends. When the frame comes back over a straight track, the reaction of the spring 24 brings back the slide 24 to its first position, so that the axis of the Bissell-frame 13 is brought back again on the axis of the vehicle-frame 11. The diagrammatical Figure 2 shows clearly that the deformations of the longitudinal driving shaft 5 will be extremely small as the only act at the pivot 12 of the Bissell-frame which is very close to the universal joints. As this central point 12 is at equal distances between these joints 6 and 7, the deformations are equally distributed between both said joints, whatever the direction of the curve may be. On the same Figure 2 it should be noted that the axis A touches the curve at a point C at equal distances between the two axles 8 and 9.

What I claim is:

1. In a running gear for a locomotives provided with four driving axles and a longitudinal driving shaft, a Bissell-frame borne by both axles of one half of the locomotive, a projection borne by the frame of the locomotive in the central longitudinal axis thereof and round which said Bissell-frame is adapted to oscillate at its inner end, two elastic joints of the longitudinal driving shaft at equal distances on either side of said projection, and means whereby said driving shaft actuates the axles.

2. In a running gear for locomotives provided with four driving axles and a longitudinal driving shaft, a Bissell-frame borne by both axles of one half of the locomotive, four rollers disposed at angles of the Bissell-frame and upon which the locomotive frame rests, a projection borne by the frame of the locomotive in the central longitudinal axis thereof and round which said Bissell-frame is adapted to oscillate at its inner end, two elastic joints of the longitudinal driving shaft at equal distances on either side of said projection, means whereby said driving shaft actuates the axles, a second projection borne by the locomotive frame in the central longitudinal axis thereof, a slide-block pivoting round said projection, two slides borne by the outer end of the Bissell-frame symmetrically disposed with reference to the longitudinal axis thereof and between which the slide block is adapted to move and two plate springs on the Bissell-frame against which the slide block is pressed at either end of its path.

In testimony whereof I have signed my name to this specification.

LOUIS BAUDET.